T. S. Hudson.
Barometer Inkstand.
No. 1,820. Reissued Nov. 15, 1864.
Fig; 1;
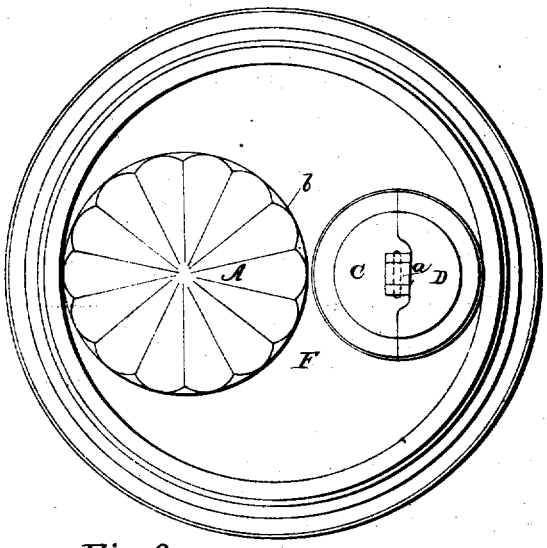
Fig; 6;
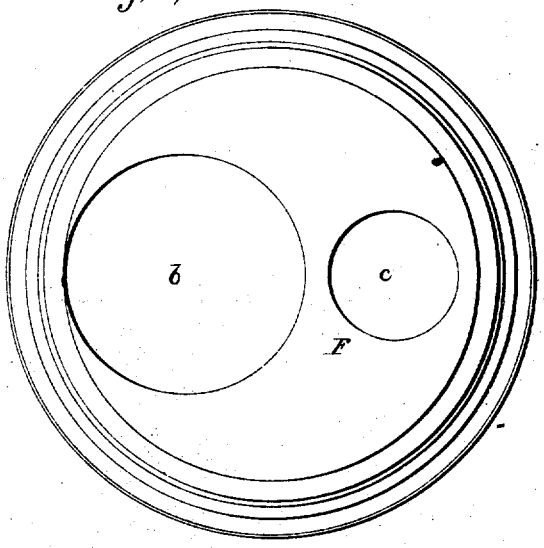
Fig; 3;
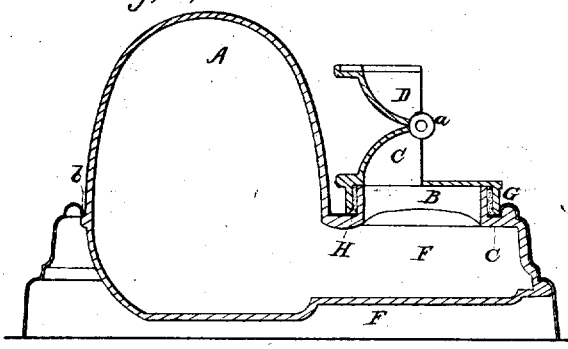
Fig; 2;
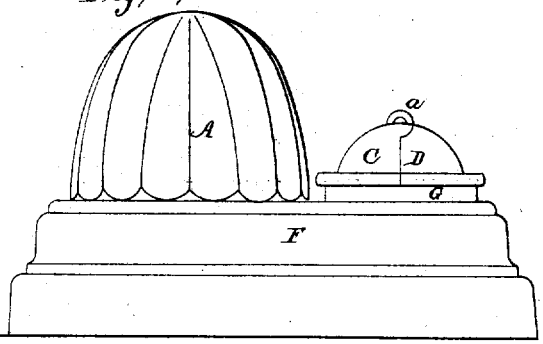
Fig; 4;
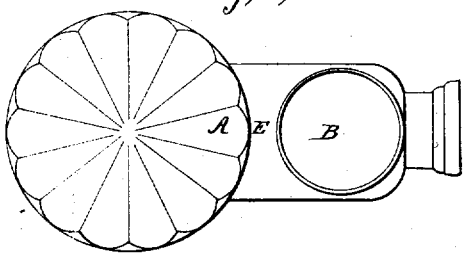
Fig; 5;
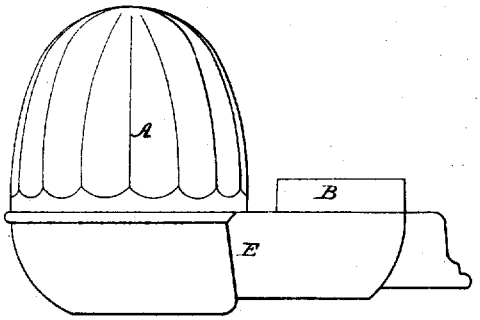
Witnesses;
Frederick Curtis.
H. H. Eddy.
Inventor;
Thos S Hudson

UNITED STATES PATENT OFFICE.

THOMAS S. HUDSON, OF EAST CAMBRIDGE, MASSACHUSETTS.

IMPROVEMENT IN BAROMETER-INKSTANDS.

Specification forming part of Letters Patent No. 32,498, dated June 4, 1861; Reissue No. 1,820, dated November 15, 1864.

*To all whom it may concern:*

Be it known that I, THOMAS S. HUDSON, of East Cambridge, in the county of Middlesex and State of Massachusetts, have invented an Improved Barometric Inkstand; and I do hereby declare the same to be fully described and represented in the following specification and the accompanying drawings, of which—

Figure 1 is a top view, Fig. 2 a side elevation, and Fig. 3 a longitudinal section, of it.

The inkstand on which my invention or improvement is made has an air and ink cistern, A, (see the drawings,) elevated above the opening or mouth of the neck B for reception of a pen. The said cistern A and the annular neck B are connected by a hollow extension or arm, E, which projects horizontally from the side of the cistern and opens out of the cistern and into the neck, the whole cistern, neck, and hollow arm being made or cast in one piece of glass, the same being formed as shown in top view in Fig. 4, and in side elevation in Fig. 5, and in longitudinal section in Fig. 3. An inverted disk or case, F, formed of sheet metal, as shown in top view in Fig. 6, in side elevation in Fig. 2, and in transverse section in Fig. 3, has two circular apertures, *b c*, made through its top, one being for the reception of the neck B, and the other being for the reception of the dome of the cistern A when the said cistern, the arm E, the neck B, and the case F are arranged as represented in Figs. 1, 2, and 3. Furthermore, the mouth or neck B may be constructed with a quarter-spherical stationary tunnel cup, C, such cup, as shown in the drawings, being extended upward from an annular collar, G, encompassing and cemented to that part of the neck B which projects above the top surface of the case F. This collar serves to confine or aid in confining the said case F to the glass cistern, its neck and arm, they being further confined together by a mass of plaster-of-paris or cement, H, run into the case so as to fill the space about the parts within it.

The tunnel-cup and the mouth of the inkstand may be provided with a quarter-spherical cover, D, hinged to the upper part of the said cup, as shown at *a*, and so that the said cover may be turned upward from the position shown in Figs. 1 and 2 into that represented in Fig. 3.

The semi-dome or cup C, projecting as it does beyond the mouth part B, enables ink to be poured to advantage into the said mouth when the inkstand is in such position that its mouth shall be upward and the plane of its bottom be vertical, or about so, in which case the ink may be poured into the inkstand until such ink may reach the level of the upper edge at the half-dome. The fountain A, as well as part of the neck B, will then be full of ink. On the inkstand being turned over into a position so as to bring its bottom horizontal, the ink will remain in the fountain or cistern, and by the pressure of the atmosphere will be maintained therein at a level above the mouth of the neck B. Without the semi dome C the inkstand can neither be supplied with ink to so great a degree or so advantageously as it can when provided with such semi-dome.

The mode of applying the metallic case or stand to the glass portion of the inkstand, and connecting them by an annular collar applied to the mouth of the cistern, is believed to be both novel and highly useful, as it operates to prevent downward pressure on the cistern from displacing the cement or plaster within the case; and, furthermore, the cement or plaster operates as a preventive to displacement of the collar from the neck, as well as to impart solidity and weight to the case.

I claim—

1. The improved barometric inkstand, as made of the glass cistern, arm, and neck, and the metallic case and collar, constructed, arranged, and combined together, substantially as set forth.

2. The combination and arrangement of the semi-dome or tunnel C, or the same and a a cover, D, with the ink-cistern and its neck, and so as to operate therewith, substantially as specified.

THOS. S. HUDSON.

Witnesses:

R. H. EDDY,

FREDERICK CURTIS.